(12) United States Patent
Hu

(10) Patent No.: US 9,241,082 B2
(45) Date of Patent: *Jan. 19, 2016

(54) METHOD AND APPARATUS FOR SCANNING THROUGH A DISPLAY SCREEN

(71) Applicant: Darwin Hu, San Jose, CA (US)

(72) Inventor: Darwin Hu, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/623,478

(22) Filed: Feb. 16, 2015

(65) Prior Publication Data

US 2015/0181059 A1 Jun. 25, 2015

Related U.S. Application Data

(63) Continuation-in-part of application No. 14/094,635, filed on Dec. 2, 2013, now Pat. No. 8,976,424, which is a continuation of application No. 13/214,184, filed on Aug. 20, 2011, now Pat. No. 8,610,970.

(51) Int. Cl.
| | |
|---|---|
| *H04N 1/04* | (2006.01) |
| *H04N 1/00* | (2006.01) |
| *H04N 1/028* | (2006.01) |
| *H04N 1/50* | (2006.01) |
| *H04N 1/10* | (2006.01) |
| *H04N 1/193* | (2006.01) |
| *H04N 1/195* | (2006.01) |
| *H04N 1/387* | (2006.01) |

(52) U.S. Cl.
CPC ......... *H04N 1/00347* (2013.01); *H04N 1/0288* (2013.01); *H04N 1/02805* (2013.01); *H04N 1/1017* (2013.01); *H04N 1/193* (2013.01); *H04N 1/195* (2013.01); *H04N 1/3876* (2013.01); *H04N 1/50* (2013.01); *H04N 2201/001* (2013.01); *H04N 2201/0063* (2013.01); *H04N 2201/0081* (2013.01); *H04N 2201/0089* (2013.01)

(58) Field of Classification Search
CPC ........... G09G 5/10; G09G 5/12; G09G 5/393; G09G 5/395; G09G 5/42; H04N 1/00127; H04N 1/00278; H04N 1/0044; H04N 1/195; H04N 5/335; H04N 9/3111; H04N 9/3164; H04N 9/3197; G06Q 50/12
USPC ................. 358/1.1, 1.14, 475, 509, 474, 487; 235/435, 439, 440, 454, 462.01, 235/462.14, 462.17, 462.43; 382/162, 167, 382/266, 274, 317

See application file for complete search history.

(56) References Cited

U.S. PATENT DOCUMENTS

| | | | | |
|---|---|---|---|---|
| 5,550,938 | A * | 8/1996 | Hayakawa et al. | 382/313 |
| 5,917,175 | A * | 6/1999 | Miller | G06F 1/1622 235/383 |
| 6,275,309 | B1 * | 8/2001 | Hu et al. | 358/473 |
| 6,891,979 | B2 * | 5/2005 | Hu et al. | 382/313 |
| 7,324,080 | B1 * | 1/2008 | Hu et al. | 345/102 |

(Continued)

*Primary Examiner* — Negussie Worku
(74) *Attorney, Agent, or Firm* — Joe Zheng

(57) ABSTRACT

Scanners built in display devices that can be controlled to have a moment of see-through either entirely or on a specified portion are described. During the see-through moment, a scanning object (e.g., a currency bill) placed against the display is scanned, hence on-screen scanner. An exemplary such display device is a Liquid Crystal Display (LCD). Without affecting the display functions of an LCD device, an image sensing module is provided with light sources. By controlling the liquid crystals in the LCD unit, the reflected light from an object placed against the LCD device to be imaged is projected onto an image sensor (or array) to generate an image of the object.

20 Claims, 18 Drawing Sheets

(56) References Cited

U.S. PATENT DOCUMENTS

| | | | |
|---|---|---|---|
| 7,394,459 B2* | 7/2008 | Bathiche et al. | 345/175 |
| 7,728,845 B2* | 6/2010 | Holub | G01J 3/02 345/589 |
| 7,990,352 B2* | 8/2011 | Hu et al. | 345/88 |
| 8,541,856 B2* | 9/2013 | Massetti | G06F 3/0428 250/216 |
| 8,610,970 B1* | 12/2013 | Hu | 358/475 |
| 8,624,810 B2* | 1/2014 | Ahn et al. | 345/87 |
| 8,624,846 B2* | 1/2014 | Fukunaga et al. | 345/173 |
| 8,947,371 B2* | 2/2015 | Noguchi et al. | 345/173 |
| 9,058,511 B2* | 6/2015 | Chou | |
| 9,098,146 B2* | 8/2015 | Yi et al. | |
| 2004/0190080 A1* | 9/2004 | Kodama et al. | 358/474 |
| 2006/0280360 A1* | 12/2006 | Holub | G01J 3/02 382/162 |
| 2007/0030530 A1* | 2/2007 | Inada et al. | 358/474 |
| 2010/0149225 A1* | 6/2010 | Kamada | 345/690 |
| 2011/0286060 A1* | 11/2011 | Murosaki | 358/498 |
| 2012/0162427 A1* | 6/2012 | Lynam | B60R 1/00 348/148 |
| 2014/0316916 A1* | 10/2014 | Hay | G06Q 20/18 705/17 |
| 2015/0015544 A1* | 1/2015 | Kim et al. | 345/175 |

* cited by examiner

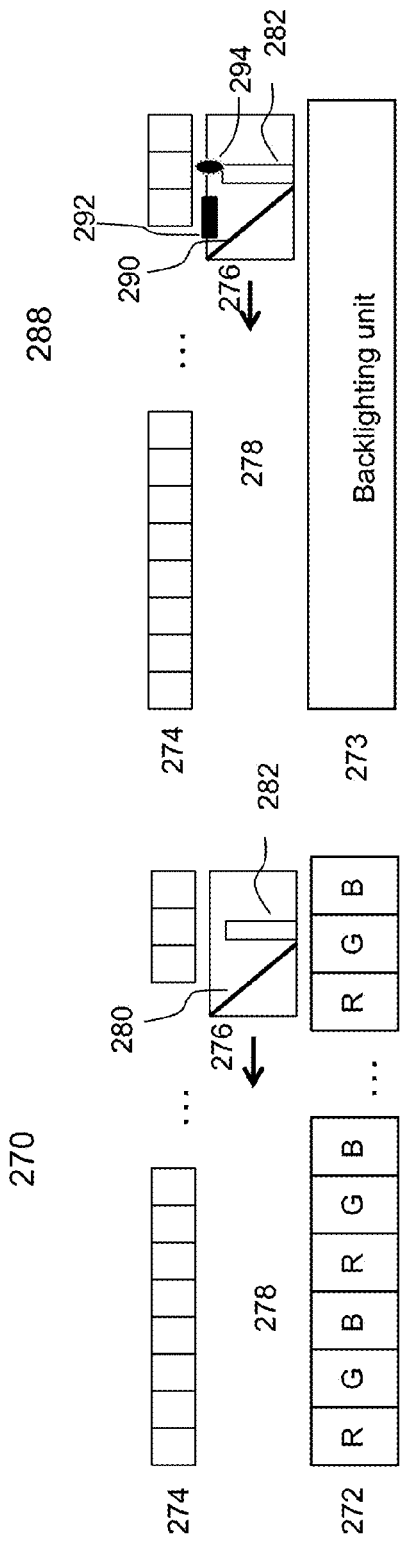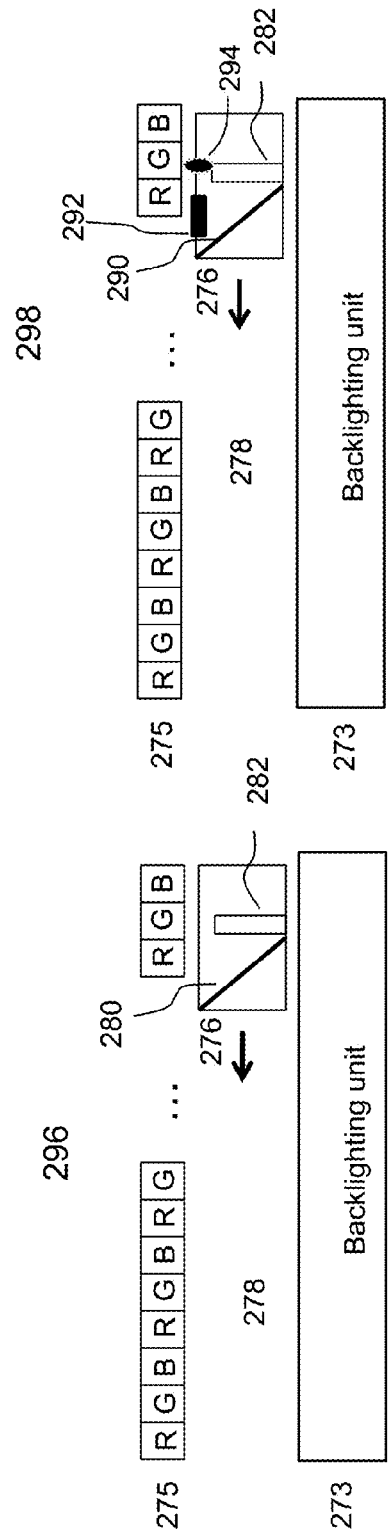

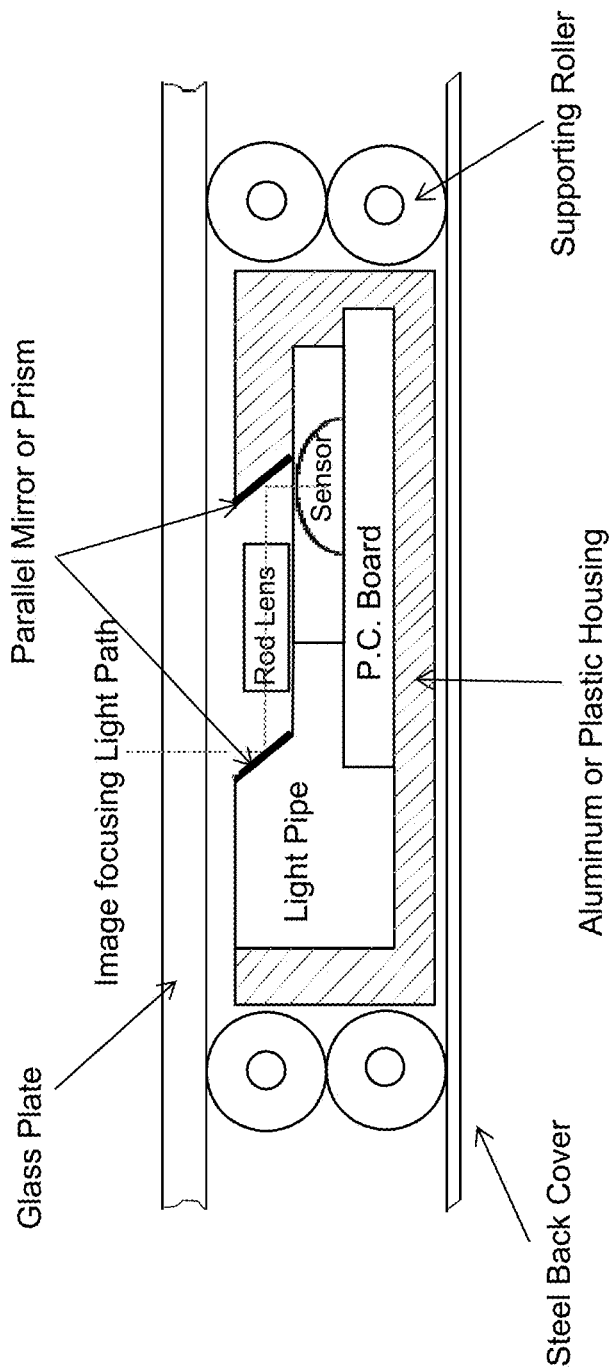
FIG. 3B.1

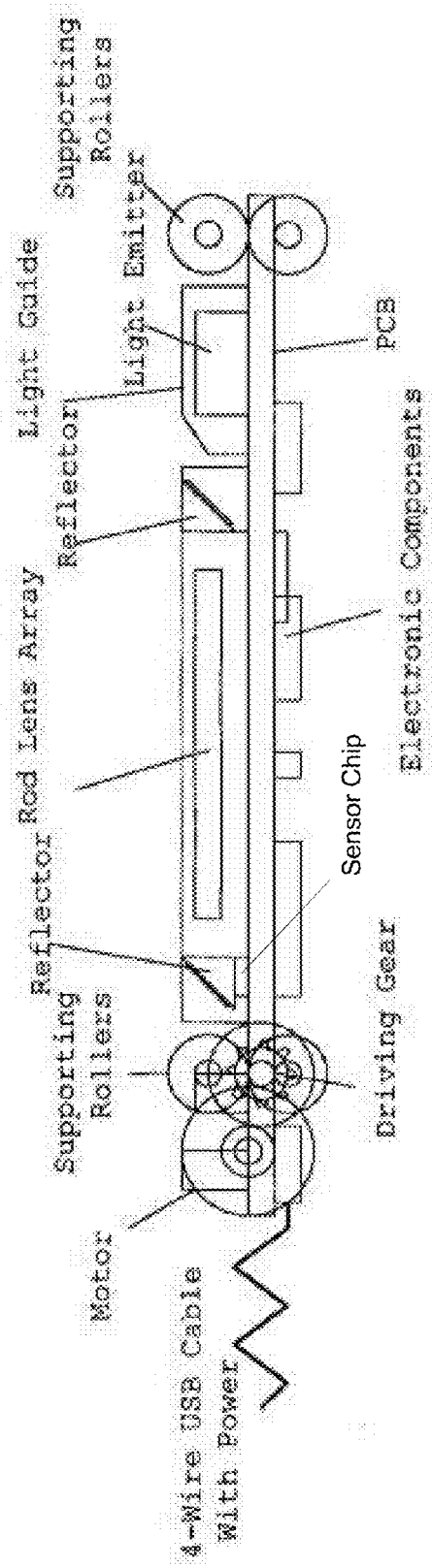
FIG. 3B.2

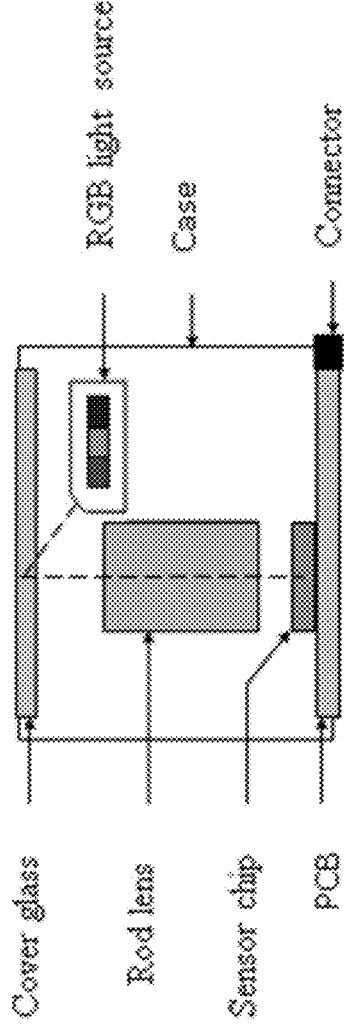
FIG. 3B.3

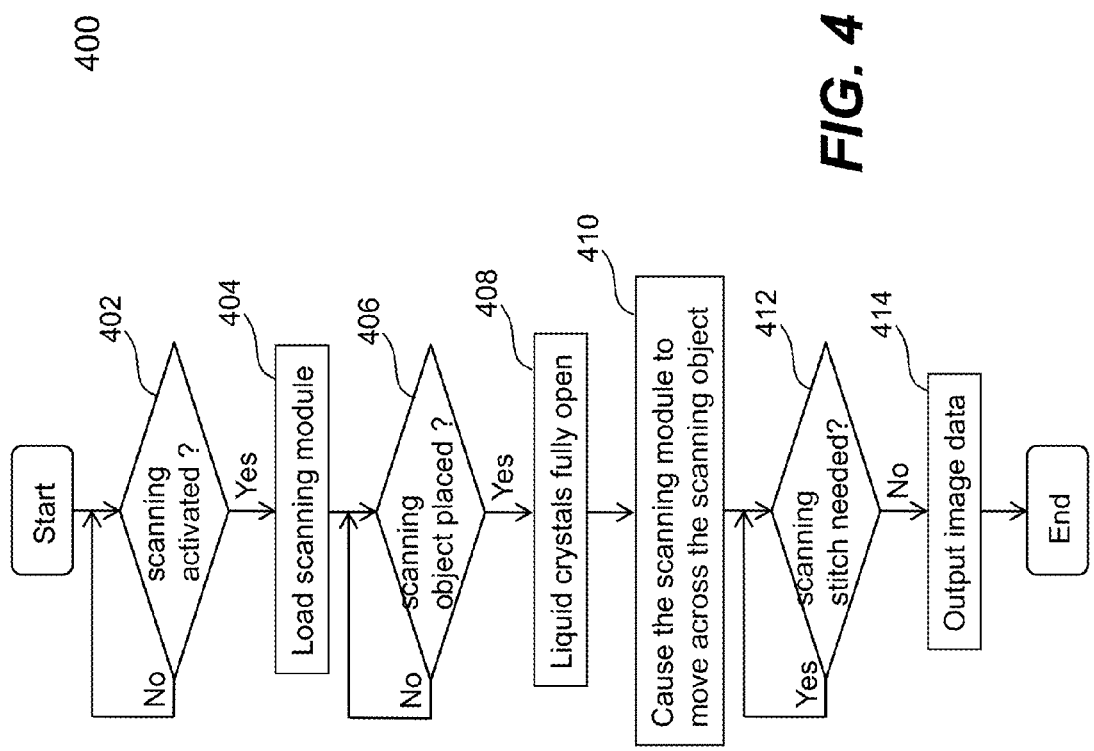

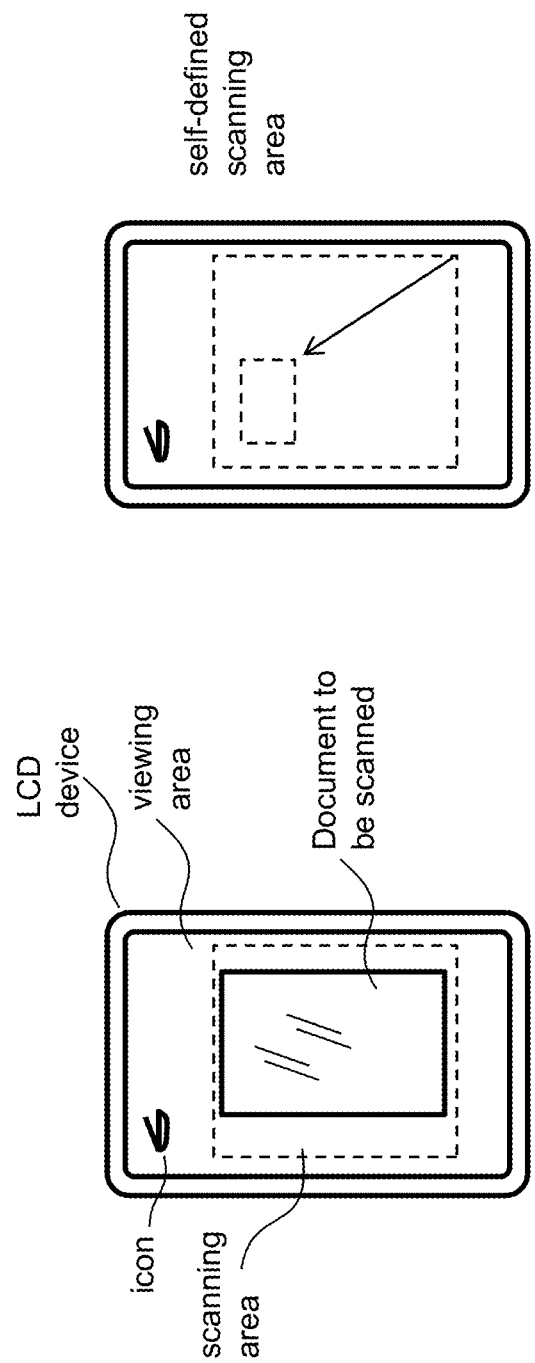

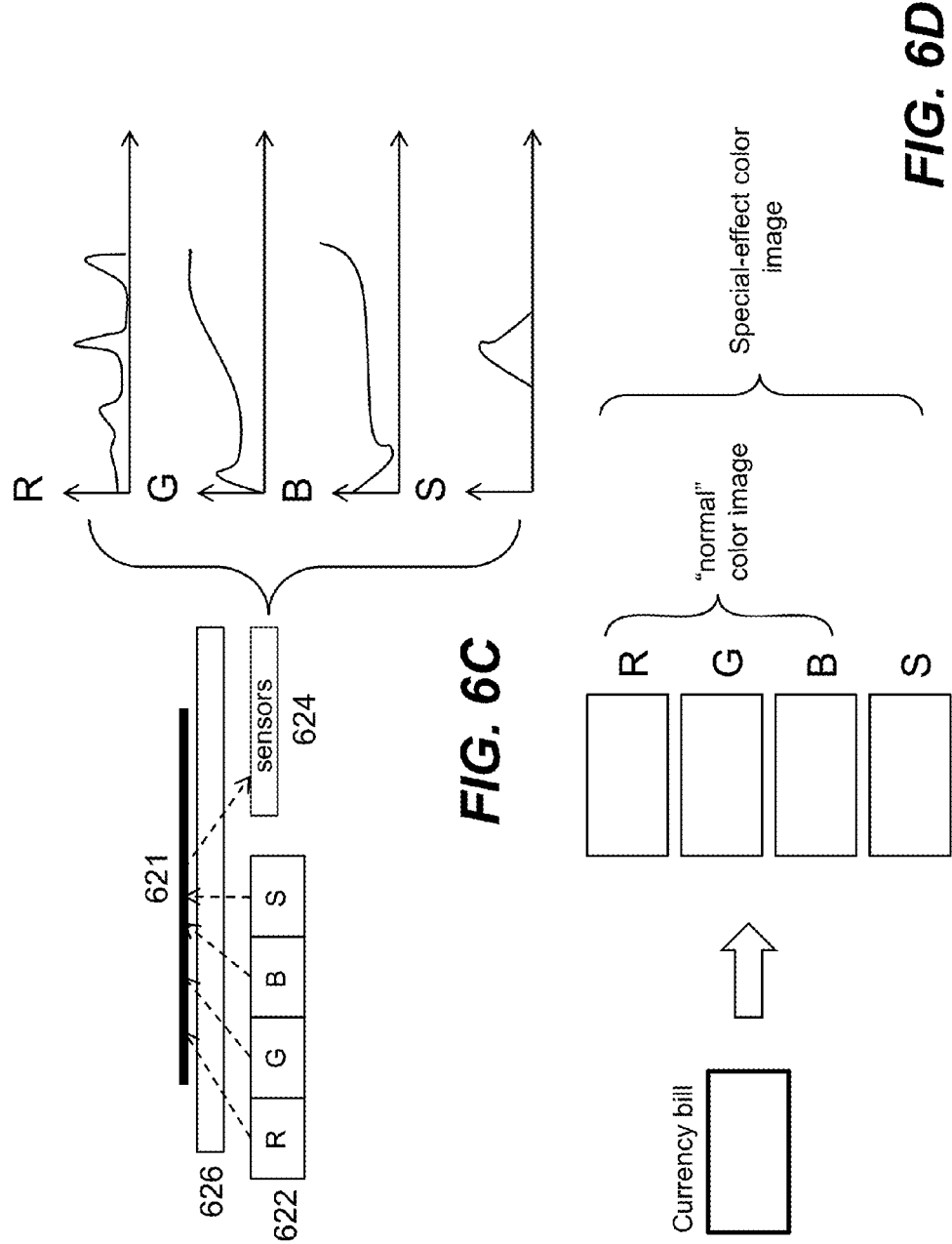

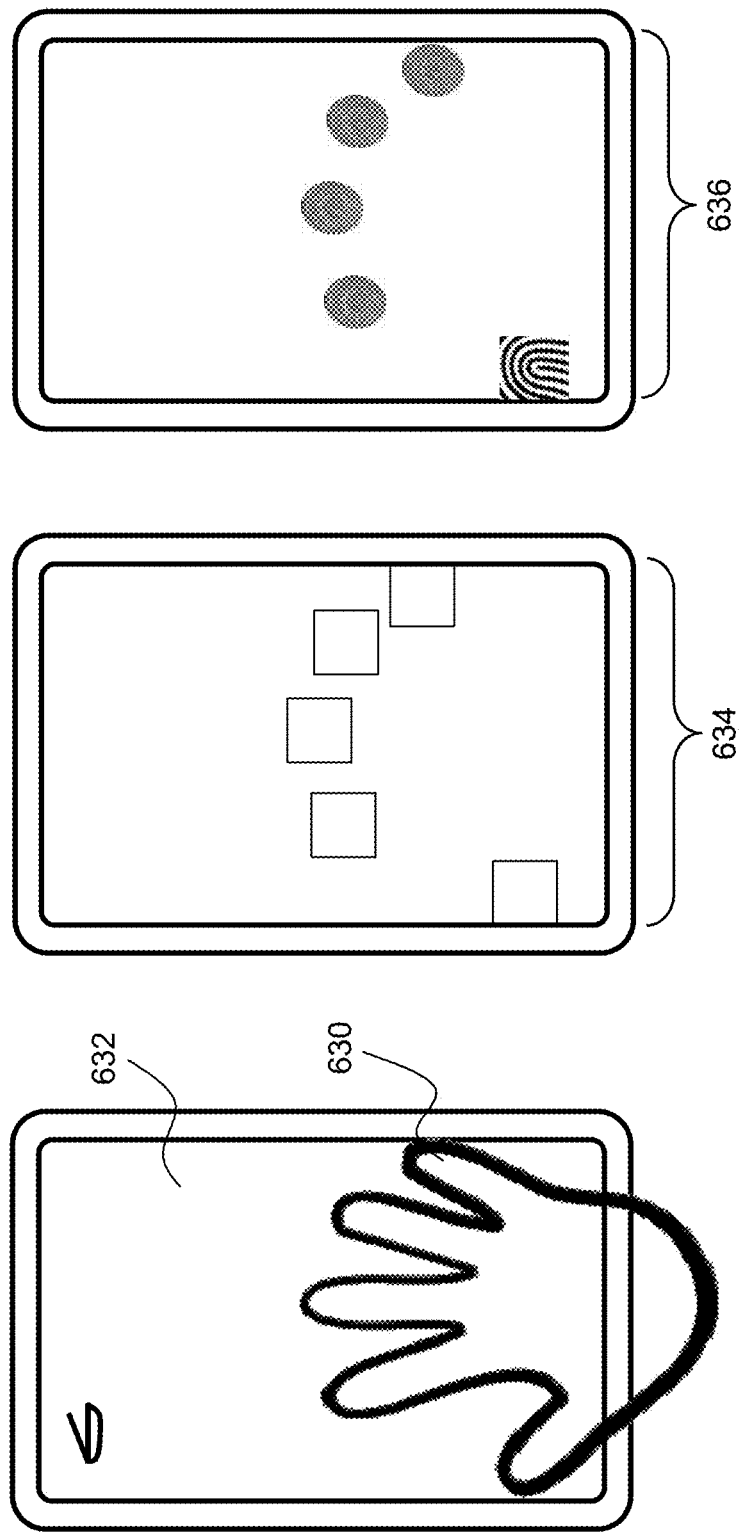

METHOD AND APPARATUS FOR SCANNING THROUGH A DISPLAY SCREEN

CROSS REFERENCE TO RELATED APPLICATIONS

This is a continuation-in-part of U.S. application Ser. No. 14/094,635, entitled "Computing devices using equipped liquid crystal display (LCD) for scanning", filed on Dec. 2, 2013, now U.S. Pat. No. 8,976,424, which is a continuation of U.S. application Ser. No. 13/214,184, entitled "Liquid crystal display (LCD) scanners", filed on Aug. 20, 2011, now U.S. Pat. No. 8,610,970.

BACKGROUND OF THE INVENTION

1. Field of the Invention

The present invention generally relates to techniques for scanning through a display screen, where such a display screen has a see-through feature and may include but not be limited to, a liquid crystal display (LCD). The scanning is achieved by a sensing mechanism disposed behind a display screen when the display screen is set for a moment of see-through so that scanning through the display screen is achieved.

2. Description of the Related Art

There are many applications that need optical scanners to convert paper-based objects, such as texts and graphics, to an electronic format that can be subsequently analyzed, distributed and archived. One of the most popular optical scanners is a flatbed scanner that converts scanning objects, including pictures and papers, to images that can be used, for example, for designing World Wide Web pages and optical character recognition. Another popular optical scanner is what is called sheet-fed scanners that are small and unobtrusive enough to be carried around, hence referred to as mobile scanners, to provide a handy scanning means.

A mobile scanner comes handy and is often used to convert actual printed or written materials into electronic format. For example, a journalist goes far away from a news bureau to collect information about an important event there. It is considerably useful that such a portable or mobile scanner can be used to scan documents on site into a computer that then forwards the electronic versions to the news bureau for immediate news reporting or archival.

Many latest mobile devices are equipped with one or more cameras. For example, iPhones from Apple Inc. are equipped with two cameras, one on the front and the other on the back to allow a user to capture video or images for various purposes. Although the image quality of such cameras is improving over the time, it is difficult to use such cameras to capture documents in good quality. Thus, various scanners are still holding their market shares and being used in applications they have been designed for.

Biometrics recognition is getting popular lately. It refers to metrics related to human characteristics (e.g., fingerprints). Biometrics authentication is used in computer science as a form of identification and access control. iPhone 5 may be the first smartphone equipped with the capability to capture a fingerprint of a user for authentication. Specifically, a touch ID (being Apple's name for the new biometric fingerprint authentication technology) is built into the home button of an iPhone. The touch ID features a stainless steel detection ring to detect the fingerprint without the user having to pressing it. There is no shape drawing in the home button. The sensor behind uses capacitive touch to detect the fingerprint of the user. The sensor used in iPhone 5S has a thickness of 170 µm with 500 pixels per inch resolution and can capture the fingerprint of a finger oriented in any direction.

As the name suggested, the touch ID on iPhone is for capturing a fingerprint and of almost no use to capture anything else. With the popularity of smartphones, a user would like to use his smartphone to do more than identification and access control. In the case of currency bill verification, neither the touch ID nor the camera could be used to verify whether a received currency bill (e.g., a $100 bill) is genuine or counterfeited.

Thus there is a need for technology that can be used to read or scan a large object on a computing device, especially those portable ones, where such technology shall not increase the size of the device when used. With the popularity of the smartphones, there is a demand that a smartphone can be used for authentication and access control. However, just relying on a single fingerprint is weak. It is believed that techniques for scanning more than one fingerprints at the same time shall be welcome and useful in the market.

There is also a need for technology that can be used to read or scan certain marks on an object that are not visible under normal lighting. It is believed that techniques for scanning such marks with a portable device shall be welcome and useful in the market.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

The present invention is generally related to scanners built in display devices that can be controlled to have a moment of see-through either entirely or on a specified portion. During the moment, a scanning object (e.g., a currency bill) placed against the display is scanned, hence on-screen scanner. According to one aspect, an exemplary display device is a Liquid Crystal Display (LCD), the on-screen scanner may also be referred to as a LCD scanner. Without affecting the display functions of an LCD device, an image sensing module is provided behind an LCD unit in the LCD device. By controlling the liquid crystals in the LCD unit, the reflected light from an object placed against the LCD device to be imaged is allowed to pass through the LCD unit and projected onto an image sensor in the image sensing module to generate an image of the object. Depending on implementation, the image sensor may be an area sensor or a linear sensor. In the case of using the linear sensor, there is a motion mechanism that is caused to move the image sensing module across a predefined scanning area to produce scanning data of the object. Once the image is produced, various applications of the image may be provided, including display, optical character recognition, verification or transmission to another device over a link (e.g., Bluetooth or RF) or network (e.g., wireless or landline Internet).

According to one aspect, an exemplary display device is a Liquid Crystal Display (LCD), the on-screen According to another aspect of the present invention, a combination of three primary colored lightings is provided to illuminate a scanning object being placed against a display screen. The exemplary three primary colored lightings are based on red, green and blue. The sources of such three primary colored lightings may be from colored LEDs (e.g., red-LED, green-LED and Blue-LED) or colored lasers.

According to still another aspect of the present invention, besides the three primary colored lightings, one or more special lightings are provided to illuminate the object to demonstrate visual features that normally do not show under the normal visual illumination. A special lighting is only turned when needed. For example, additional features of a currency bill will be shown when illuminated under ultraviolet, or blood vessels under skin will be shown when illuminated under inferred.

The present invention may be implemented as an apparatus or a part of system. According to one embodiment, the present invention is a display device comprising: a display unit; an image sensing module behind the display unit, the image sensing module including an array of photosensors; and a set of different lighting sources to illuminate a scanning object being placed against the display unit through the display unit, wherein the display unit is driven to have a moment of see-through, and the different lighting sources are turned on successively for the photosensors to generate corresponding colored images. The different lighting sources includes at least three primary colored lights to generate a color image for reproducing colors in the scanning object. Additionally, the different lighting sources includes at least a special light to reveal certain marks in the scanning object when the special light is turned on, these marks are not meant visible under a normal lighting.

According to another embodiment of the present invention, the present invention is a computing device with a display device, the display device comprises: a display unit including a white backlight and an array of three different colored filters; and an image sensing module disposed on top of the display unit, the image sensing module including a special light, a light waveguide and an array of photosensors, wherein the special light is caused to turn on to illuminate a scanning object being placed onto the display unit and imaged by some or all of the photosensors to produce a special-effect image. The special light is disposed on one side of the light waveguide and impinged onto the light waveguide that produces even lighting to illuminate some or all of the scanning object photosensors. Optionally, the special light is only turned on when the scanning object includes certain marks that are not visible under a normal lighting condition. The computing device is configured to execute an application, the application is configured to turn on the special light to produce the special-effect image.

One of the features, benefits and advantages in the present invention is to provide scanning functions on a display screen so that the scanning size is considerably enlarged without increasing the size of a computing device with such a display screen. For example, instead of scanning a portion of a fingerprint, a computing device equipped with one embodiment of the present invention is now able to scan the all fingerprints in a hand.

Another one of the features, benefits and advantages in the present invention is to equip such a computing device with additional scanning capabilities such as verifying currency bills or some medical routine checkups.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 2D, FIG. 2E, FIG. 2F and FIG. 2G show respectively four exemplary embodiments to illustrate how an image sensing module may be used in different configurations in an LCD device;

FIG. 3B.1 shows a cross-section view of a LCD display including a scanning module with a set of rollers driven by a motor behind or within an LCD unit;

FIG. 3B.2 shows another cross-section view of a LCD display including a scanning module with a set of rollers driven by a motor behind or within an LCD unit;

FIG. 3B.3 shows a cross-section view of a scanning module that may be used in one of the embodiments in the current invention;

FIG. 4 shows a flowchart or process for an LCD scanner to scan a scanning object (e.g., a document) according to one embodiment of the present invention;

FIG. 5A shows a predefined scanning area on an LCD device that is smaller than the viewing area;

FIG. 5B shows another embodiment in which a user is allowed to define a scanning area;

FIG. 6C shows a simplified cross-section view of an LCD;

FIG. 6D shows that three of the four colored images R, G, and B are sufficient to reproduce the colors in a scanning object shown as a currency bill;

FIG. 6E shows how one embodiment of the present invention is used to scan more than one fingerprint;

DETAILED DESCRIPTION OF THE PREFERRED EMBODIMENTS

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
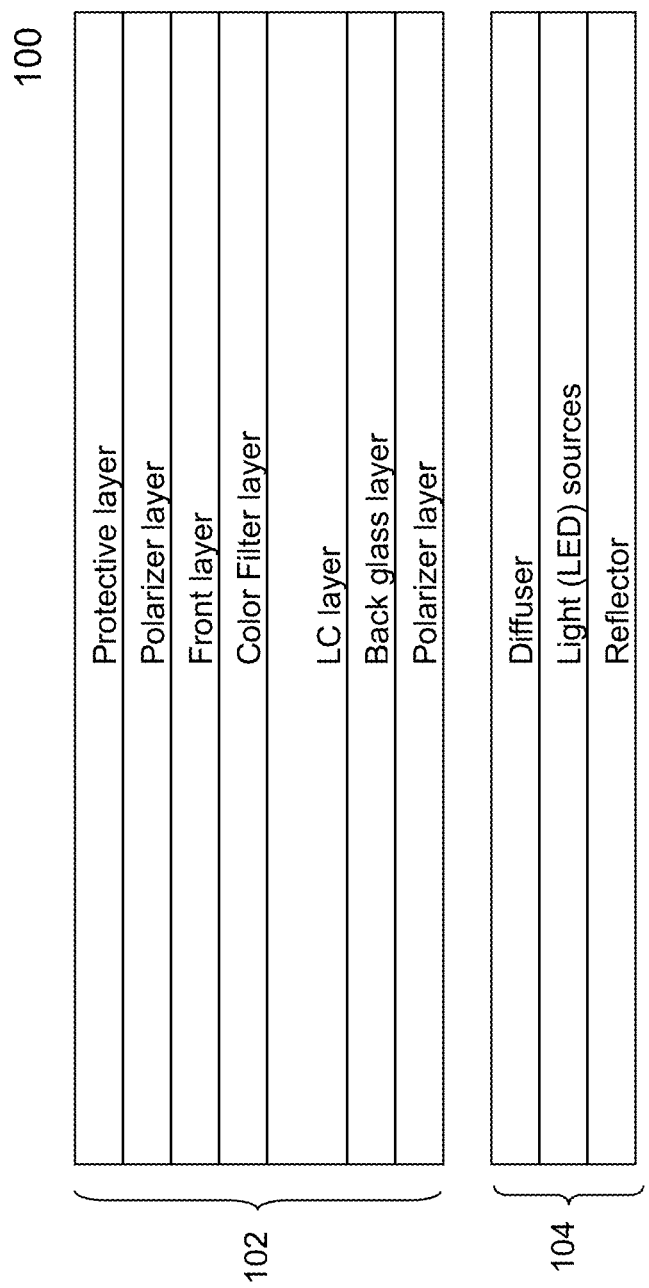
FIG. 1 shows a cross sectional view of an LCD device that may be used in one embodiment of the present invention.

The present invention can be advantageously employed with a display screen that can be controlled to have a moment of see-through characteristics. An example of such see-through display screen includes, but may not be limited to, an LCD device. Referring now to the drawings, in which like numerals refer to like parts throughout the several views. FIG. 1 shows a cross-sectional view of an exemplary LCD device 100. The LCD device 100 includes an LCD panel 102 and a backlighting section 104. As used herein, an LCD device is a display device that may be a standalone display often connected to a host (e.g., a desktop computer) or part of a computing device (e.g., iPad or iPhone from Apple Inc.) while an LCD panel or unit means a component in the LCD device to facilitate the display through the liquid crystals therein.

The LCD panel 102 is made of several layers to produce an image illuminated by the backlighting section 104. In one perspective, the LCD panel 102 includes a layer of liquid crystals that acts as a plurality of light switches between polarizing filters. Light coming from the backlighting section 104 is blocked, partially or completely transmitted through depending on an image being displayed. In other words, when the liquid crystals are all fully opened, a full amount of the light from the backlighting section 104 goes through the LCD panel 102, leaving an impression of a white image, where it is assumed that the backlighting section 104 produces a white backlighting. Likewise, when the liquid crystals are fully closed, the light coming from the backlighting section 104 is completely blocked, leaving an impression of a black image. Thus a displayed image on an LCD device is viewed when the liquid crystals are selectively and respectively controlled to allow none, some or all of the backlighting to pass through (namely opened at varying degrees). A colored image is subsequently created by modulating respective color filters (e.g., red, green and blue filters) disposed in the way of the transmitted backlighting.

Figure 2A:
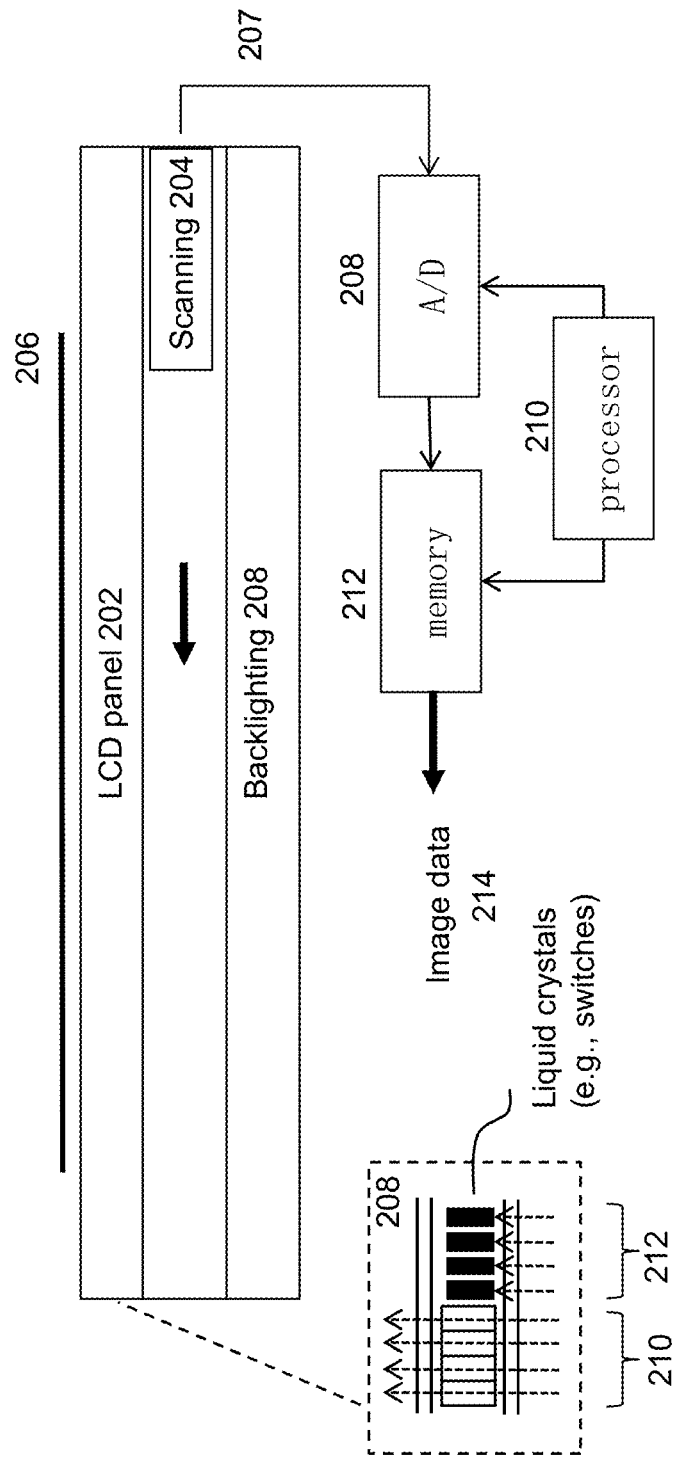
FIG. 2A shows an exemplary LCD display modified to provide scanning function according to one embodiment of the present invention, hence LCD scanner herein.

FIG. 2A shows an exemplary LCD display 200 designed to provide scanning function according to one embodiment of the present invention, hence LCD scanner herein. In one embodiment, the LCD scanner 200 includes most of things a normal LCD device has but can be used to scan a document (e.g., a receipt and a printed article). As shown in FIG. 2A, between an LCD panel 202 and the backlighting unit 208, there is a space 204 in which a scanning mechanism 204 is provided to take a photo of an object 206 placed against the front side of the LCD panel 202, where the front side is where a viewer looks for an image being displayed on an LCD device. As will be further described below, the scanning mechanism 204 includes at least an image sensor (e.g., CMOS or CCD photo sensor). Depending on implementation, the image sensor may be an area sensor or a linear sensor. Those skilled in the art shall understand the necessary optical configuration for an area image sensor to take a snapshot of the object being placed against the LCD device. Without loss of generality, the following description is based on a scanning mechanism that includes a linear image sensor. Thus the scanning mechanism will be moved across at least some of the LCD device to scan some or all of a scanning object being placed against the LCD device.

For illustration purpose, FIG. 2A also shows an exploded view 208 of the liquid crystals acting as "light switches". When the light switches 210 are turned on, namely the liquid crystals are twisted to open a pathway, light from the backlighting unit 208 transmits through these switches 210 and can be seen by a viewer. When the light switches 211 are turned off, namely the liquid crystals are twisted to close a pathway, light from the backlighting unit 208 is blocked and cannot be seen by a viewer. By the same principle, the scanning object 206 can be seen by the scanning mechanism 204 when the layer of the liquid crystals or the liquid crystals are controlled to fully open.

Figure 2B:
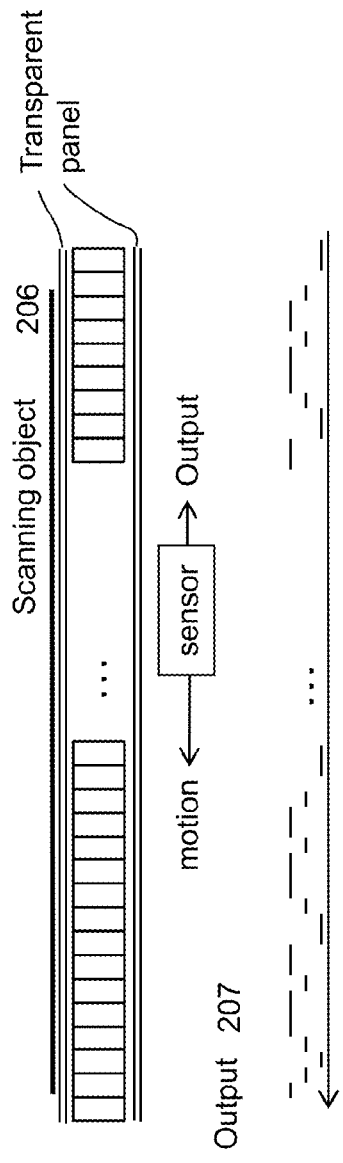
FIG. 2B shows how a scanning object is being sensed by a scanning mechanism, where the scanning mechanism includes an image sensor.

According to one embodiment, FIG. 2B shows how the scanning object 206 is being sensed by the scanning mechanism 204 with a sensor. The liquid crystals are protected by at least two transparent panels and controlled externally by a control board (not shown), where the control board is designed to control how the liquid crystals to react to an image to be displayed therethrough. In the event that the scanning function is activated (e.g., via a program or an activation), the control board causes some or all the liquid crystals to fully open, thus allowing the reflection of the scanning object 206 to transmit through and onto the scanning mechanism 204.

As will be further understood below, the scanning mechanism 204 may be a moving module or stationary module. For illustration, the scanning mechanism 204 is shown in FIG. 2B as a motion module to move from one side to another so that the entire area of the display can be scanned or sensed. In one embodiment, the pathway formed by each of the liquid crystals acts as a rod lens to collect or focus a certain amount of the reflection from the scanning object 206 onto the sensor in the scanning mechanism 204. A linear sensor (e.g., an elongated sensor) may be used in the scanning mechanism 204 to generate a sensing signal 207.

Referring back to FIG. 2A, the sensing signal 207 is coupled to a circuit (e.g., ADC) 208 for digitization. The digitized signal is coupled to a memory space 212 (e.g., RAM) for readout as image data 214 to an application (e.g., display, transmission to another computer or optical character recognition).

Figure 2C:
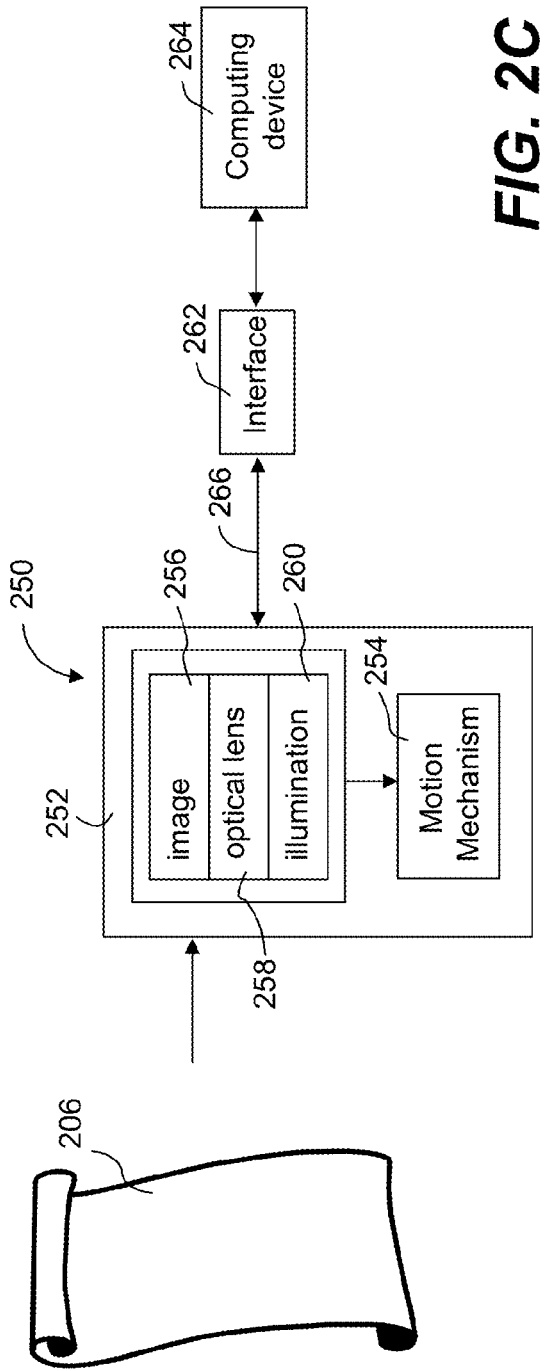
FIG. 2C shows a block diagram for a LCD scanner according to one embodiment of the present invention.

Referring now to FIG. 2C, there is shown a block diagram for a LCD scanner 250 according to one embodiment of the present invention. The LCD scanner 250 that may be integrated into an LCD device. The LCD scanner 250 comprises two parts: an image sensing module 252 and a motion mechanism 254. In one embodiment, the image sensing module 252 may be used as the scanning mechanism 204. It should be noted that there is no separate power supply to energize the image sensing module 252 and the motion mechanism 254 to work. The power to the image sensing module 252 and the motion mechanism 254 is "borrowed" from the LCD device used to display an image (video) as well as to capture an image of a scene by way of scanning.

In one embodiment, the image sensing module 252 comprises an image sensor 256, an optical lens 258 and an illumination system 260. Preferably, the image sensor 256 is an array of Complementary Metal-Oxide Semiconductor (CMOS) photodetectors, each producing a charge signal when being exposed to an incident light. Generally, the number of photodetectors in the array depends on the maximum size of a scanning document the scanner is designed to accommodate and the resultant image resolution. For example, a regular paper has a size of 8.5×11 inches. For 300 dpi (dot per inch) resolution, the number of photodetectors is 9×300=2,700 wherein 0.5 inch is added to account for a margin of the 8.5-inch width.

The optical lens 258 collects the reflected light from a scanning object illuminated by an illumination source 260 onto the image sensor 256, thereby an image of the scanning object is produced. The motion mechanism 254 is responsible for moving the image sensing module 252 vertically or horizontally across some or all of the display area of the LCD device so that the scanning object can be scanned.

The image generated is readout via a data bus 266 to an interface 262 that is coupled to a computing device 264. The interface 262 may be of the industrial standards (e.g., PCI or USB). Depending on implementation, the computing device 264 may be a tablet computer, a laptop computer, a desktop computer or any computing device with an LCD display (e.g., iPhone or iPad).

According to one embodiment, FIG. 2D shows an illustration 270 of using the backlighting in the LCD device to illuminate a scanning document. It is assumed that the LCD device has a backlighting unit that is based on LEDs in three primary color groups (e.g., Red, Green and Blue). The detailed operations of the backlighting unit are described in U.S. Pat. No. 7,324,080 which is hereby incorporated by reference. The LEDs in color groups are sequentially turned on for each frame of image to be displayed on the LCD device.

When a document is to be scanned in color by the LCD device, the colored illumination from the backlighting unit 272 is used to illuminate the document through the opened liquid crystals 274. In operation, an image sensing module 276 is caused to move along a space 278 provided between the backlighting unit 272 and the liquid crystals 274 (other layers are omitted for illustration purpose). The image sensing module 276 comprises a lens or an optical part 280 and an image sensor 282. The optical part 280 is designed to capture the reflected light from the document and directs or focuses it onto the sensor 282.

In one embodiment, for a line of scanning, the LEDs in color groups are sequentially turned on, resulting in three signals from the sensor 282, each for one of the colored lighting. Upon finishing going across the document, the sensor 282 has produced three sets of scanning signals. Once these scanning signals are properly combined, a colored scanned image is produced.

FIG. 2E shows another embodiment in which an image sensing module 290 is designed to provide its own light source, in which case, illumination from the backlighting unit 272 does not matter to the scanning. The image sensing module 290 comprises an optical part (e.g., a mirror or a filter) 292, a lens 294 and a light source 282. Depending on whether to generate a black-and-white image or a color image, the light source 282 may be a white light source or a colored light source. For example, in the application of scanning business cards for optical character recognition, black-and-white scanning would be sufficient. Nevertheless, those skilled in the art would understand even a colored light source can be configured to produce a white lighting.

In operation, a document being scanned is illuminated by the light source 294. The reflected light from the document being scanned is transmitted through the liquid crystals (fully opened) and directed or focused by the lens 294 onto the image sensor 282. In one embodiment, the light source 282 includes at least three colored lights (e.g., LEDs in red, green and blue). For every scanning, the three colored lights are sequentially turned on, resulting in three signals from the sensor 282, each for one of the colored lights. Upon finishing going across the document, the sensor 282 has produced three sets of scanning signals. Once these scanning signals are properly combined, a colored scanned image is produced.

FIG. 2F shows an LCD device that uses color filters in conjunction with the liquid crystals with a white backlighting to show color images/videos. The color filters (e.g., in red, green and blue) are provided to convert the white backlighting to corresponding red, green and blue lights for each pixel, resulting in a color presentation on the LCD device. In a similar fashion, the white backlighting illuminates a document being scanned via the corresponding color filters, where the image sensor 282 is exposed to colored lights and generates three scanning signals or data. Once these scanning signals or data are properly combined, a colored scanned image is produced.

FIG. 2G shows a similar LCD device that uses color filters in conjunction with the liquid crystals but with a white backlighting to show color images/videos. Instead of using the backlighting unit 273 to illuminate a document being scanned, the light 294 in the image sensing module 276 is provided to illuminate the document via the color filters. The corresponding liquid crystals to the color filters are controlled to turn on sequentially for the image sensing module 276 to capture corresponding colored reflected lights to generate three scanning signals or data. Once these scanning signals or data are properly combined, a colored scanned image is produced.

FIG. 2D, FIG. 2E, FIG. 2F and FIG. 2G show respectively four exemplary embodiments to illustrate how an image sensing module may be used in different configurations in an LCD device. Given the descriptions herein, those skilled in the art may appreciate other combinations among different configurations in an LCD device and an image sensing module are possible and within the disclosure of the present invention.

In one embodiment, referring to FIG. 2E, the backlighting unit 272 provides the normal lighting while the light source in the image sensing module 290 is a special lighting to illuminate certain features of the scanning object that would not be otherwise shown under the normal lighting. In one embodiment, the light source in the image sensing module 290 employs a ultraviolet light that reveals special marks of a currency bill. The light source in the image sensing module 290 is only turned when there is a need to highlight certain marks (e.g., verifying a currency bill). It should be noted that the light source in the image sensing module 290 may be any type of light to provide a special lighting.

Figure 3A:
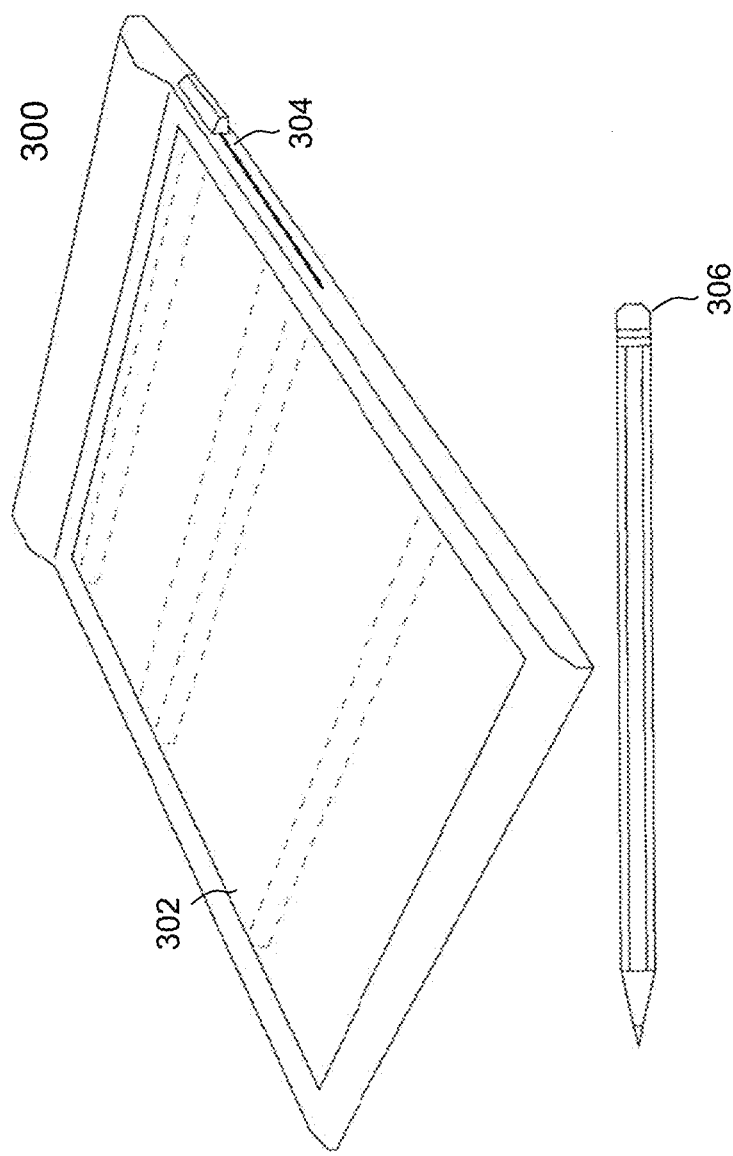
FIG. 3A shows an example of a computing device equipped with scanning capability.

FIG. 3A shows an example of a computing device 300 equipped with scanning capability. The computing device 300 includes an LCD display 302. Under the LCD display 302, there is a scanning module corresponding to the motion mechanism 254 of FIG. 2A. The scanning function of the computing device 300 is activated by a program installed therein. Depending on implementation, the scanning module behind the LCD display 302 may be automatically driven or manually moved to go across a partial or the entire area of the LCD display 302. In one embodiment, the program is activated, for example, by a stylus or a touch on the LCD display 302, to activate the scanning capability.

FIG. 3B.1 shows a cross-section view of a LCD display including a scanning module with a set of rollers driven by a motor behind or within an LCD unit. FIG. 3B.2 shows another cross-section view of a LCD display including a scanning module with a set of rollers driven by a motor behind or within an LCD unit. FIG. 3B.2 shows a design to illustrate how a scanning module moves behind or within an LCD display. The scanning module as illustrated includes a reflector to reflect the reflection from the scanning object being illuminated by one or more LEDs onto an image sensor. The use of one or more reflector is to make the scanning module as low profile as possible so that the thickness of an LCD device would not be affected too much, especially in the case of portable devices. In any case, it should be noted the illumination and capturing of the reflection of the scanning object are possible only when the liquid crystals are fully or substantially opened to allow light to go through. FIG. 3B.3 shows a cross-section view of a scanning module that may be used in one of the embodiments in the current invention.

FIG. 4 shows a flowchart or process 400 for an LCD scanner to scan a scanning object (e.g., a document) according to one embodiment of the present invention. The process 400 may be implemented in a computing device with an LCD or in a LCD device itself. According to one embodiment, the process 400 may be further understood in conjunction with FIG. 2A-FIG. 2C.

At 402, the process 400 determines if the scanning function of an LCD device is activated. Depending on implementation, the scanning function of an LCD device is activated via a button accessible on the LCD device or via a program. For example, a user needs to scan a receipt, an application or a step in a program preinstalled in a computing device is activated to start the scanning process. At 404, a processor in the LCD device or a computing device to which the LCD device is coupled thereto is configured to instruct a user to place the scanning object (i.e., a receipt or a document) onto or against the LCD device. A technique may be provided to detect if such an object has been placed against the LCD device or not.

It is assumed at 406 that a document has been placed against a front side of the LCD device. At 408, a module in the LCD device or in the computing device is configured to turn on all the liquid crystals in a liquid crystal layer in the LCD device. The "opened" liquid crystals allow the reflected light from the object to pass through the liquid crystal layer and onto an image sensor in the image sensing module.

In one embodiment, the image sensing module includes an area sensor that can capture an image of the object in one snapshot. In another embodiment, the image sensing module includes a linear image sensor that must be moved by a motion mechanism (e.g., rollers and/or motors). As shown in FIG. 4, as an example, the image sensing mechanism is caused to move across a predefined area of the LCD device at 410 to scan some or all of the object.

Although it is possible to have the entire viewing area of the LCD device to be a scanning area, some manufacturers may preferably define a specific area for scanning (e.g., smaller than the viewing area). FIG. 5A shows a predefined scanning area on an LCD device that is smaller than the viewing area. One advantage for this feature is to allow a user to activate other application before or after an object is placed against the display area. As shown in FIG. 5A, a scanning icon may be activated to take a snapshot of the scanning object or start the scanning after a user places the object onto the display screen.

FIG. 5B shows another embodiment in which a user is allowed to define a scanning area. For example, when the LCD device (e.g., iPad) is used to scan a business card, the viewing area is much bigger than the size of a business card. To avoid generating a lot of useless data surrounding a business card being scanned, in one embodiment, a (software) module is provided to allow a user to self-define a scanning area in which case only corresponding liquid crystals in a liquid crystal layer of the LCD device are controlled to allow the reflected light from the business card being illuminated to pass through, the ambient light would be blocked by other liquid crystals in the liquid crystal layer of the LCD device. With corresponding designs to control the image sensing module, an image covering substantially the business card is generated.

It should be noted that there are a few places herein appearing "a document is or is being illuminated" or the like does not necessarily mean that the document being placed against the LCD device is illuminated in its entirety at the same time. In some embodiments, only or around the area of the document being scanned by the underlying image sensing module is illuminated. As a result, a user may see a moving elongated illuminating line appears on the LCD device, and within a scanning area.

Figure 5C:
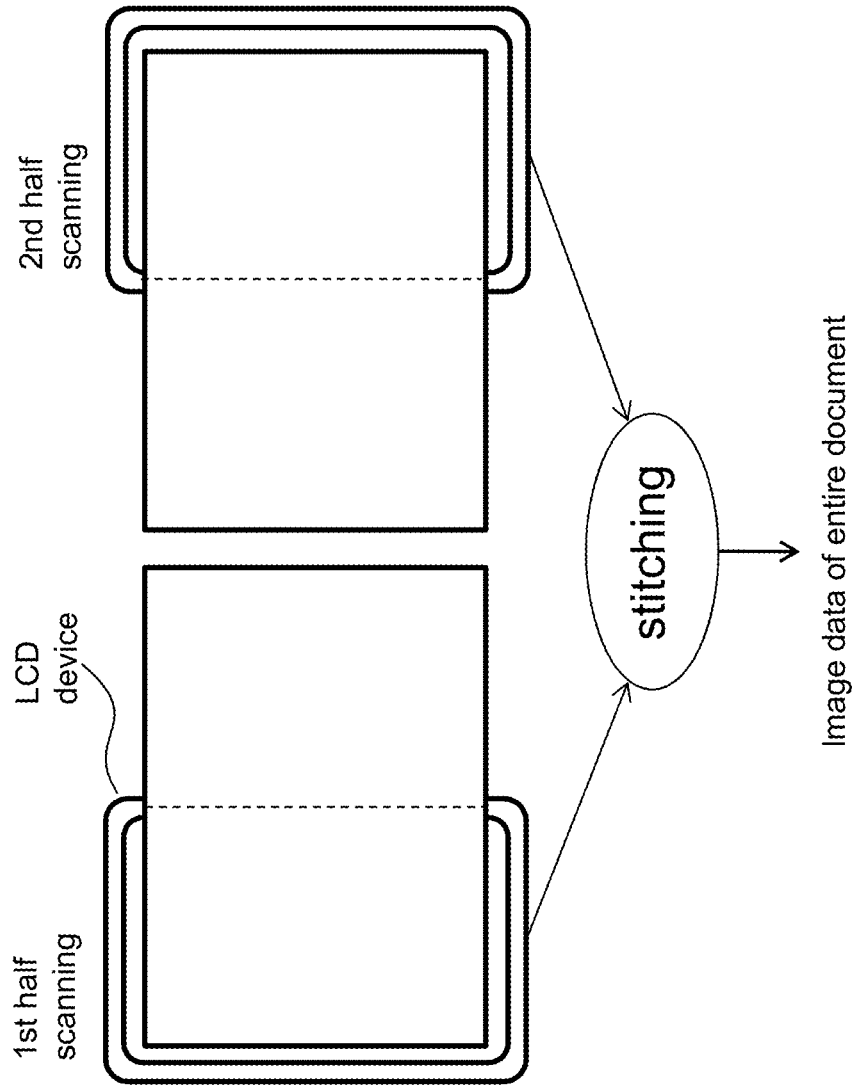
FIG. 5C shows that a computing device (e.g., iPad) has a viewing area not sufficiently large enough to accommodate a piece of letter-sized paper, thus a user needs to scan a document twice to produce an entire image of the paper.

In some cases, a computing device (e.g., iPad) has a viewing area not sufficiently large enough to accommodate a piece of letter-sized paper, a user may be instructed to scan a document twice as shown in FIG. 5C, where a tablet computer has a viewing area that is about a half of a document to be scanned. Thus a user will be asked to scan a first half of the document then the second half of the document at 412. Operationally, the computing device is equipped with a stitching module configured to stitch or combine two scanning data together to produce an entire image of the document at 412.

Referring back to FIG. 4. At 414, the image is read out, typically from RAM (corresponding to the memory 212 of FIG. 2A). The image is then provided to an application (e.g., display, optical character recognition or transmission to another computing device).

Figure 6A:
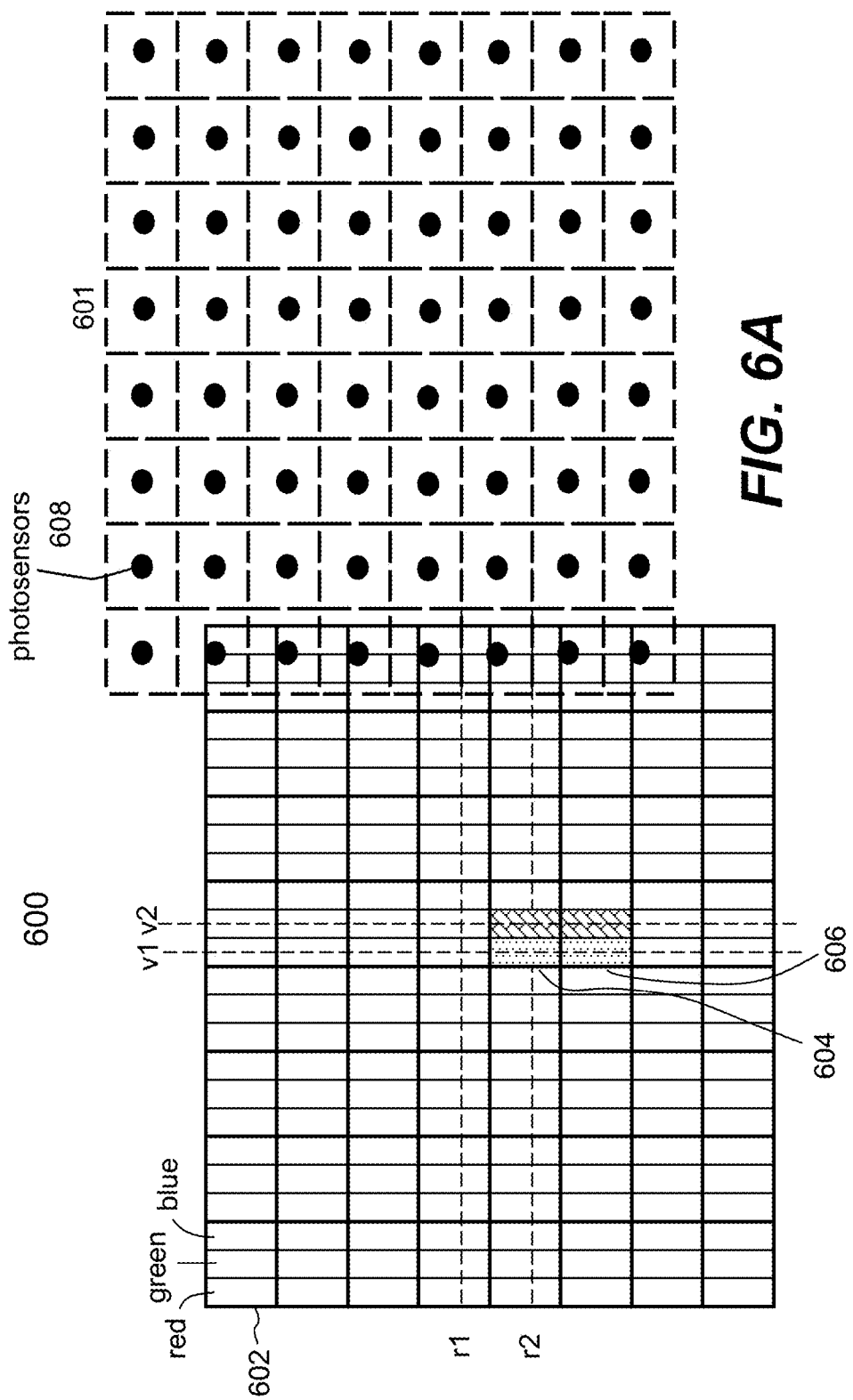
FIG. 6A shows another embodiment of using an array of photosensors on a transparent sheet (e.g., a thin film or glass sheet)

Instead of using a scanning module that is caused to move across a scanning object being placed against a display, FIG. 6A shows one embodiment of using an array of photosensors on a transparent sheet 601 (e.g., a thin film or glass sheet). A photosensor is an electronic component that detects the presence of visible light, infrared (IR), and/or ultraviolet (UV) energy. The photosensors may use light-sensitive diodes (e.g., CCD or CMOS). As an example, an LCD unit 600 is made with three colored filters (e.g., red, green and blue) as a single (display) pixel and white backlighting. Each of the pixels, such as a pixel 602, has three subpixels labeled respectively red, green and blue. Through the careful control and variation of the voltage applied thereon, each subpixel can reach 256 levels of brightness (shades) per pixel. Combining the subpixels produces a possible palette of 16.8 million colors (e.g., 256 shades of red×256 shades of green×256 shades of blue). For example, when two subpixels in pixels 604 and 605 are applied with control signals via column and row lines, the backlighting passes through the red and green subpixels, causing a mixed impression of "yellow". In extreme cases, when all subpixels in a pixel are turned on or off, a white or black color is created or perceived. In applications of showing an image or video on an LCD, control signals in accordance with an image or video are applied to the pixels, respectively, causing the subpixels in each of the pixels respectively on or off. As a result, the colored image or video is displayed on the LCD.

The transparent sheet 601 is disposed behind the array of colored filters and corresponding liquid crystals (shown as shifted for illustration). In one embodiment, one or more photosensors 608 are provided for each of the pixels to sense the colored lights respectively from the corresponding pixel. In one embodiment, each of the photosensors 608 is provided with a lens to facilitate the focusing of a corresponding light onto the photosensor. Instead of going across the document, the photosensors 608 take snapshots of an object being placed against the display screen to produce three sets of image signals (e.g., red, green and blue). A circuit module, coupled to the photosensors, is provided to read out the image signals from the photosensors. The detail of the circuit module is not further described as those skilled in the art shall know the design given the description herein. Once the three images are properly combined, a colored snapshot image is produced.

Figure 6B:
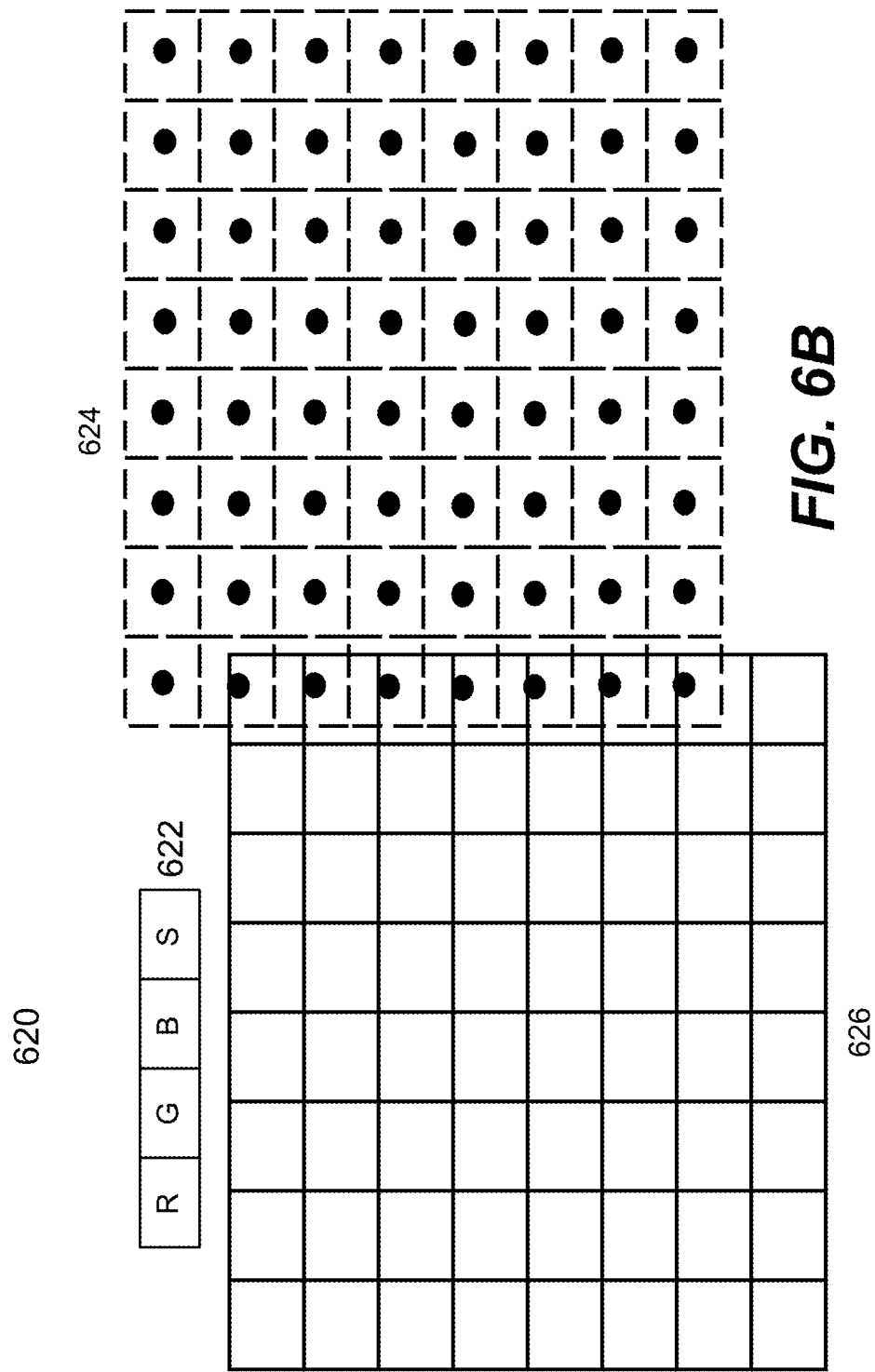
FIG. 6B shows another embodiment of an LCD device, where instead of using the subpixels with colored filters, the LCD device uses at least three colored lights to illuminate a scanning object.

FIG. 6B shows another embodiment 620 of an LCD device. Instead of using the subpixels with colored filters, the LCD device uses at least three colored lights to illuminate a scanning object. One or more special lights are employed to reveal certain marks in a scanning object. The embodiment 620 shows that there are four colored lights 622 (more could be added if needed). Among the four colored lights 622, there are red (R), green (G) and blue (B) lights and one special (S) light (e.g., ultraviolet or infrared).

In operation, the liquid crystals (not shown) for the entire display area or a defined area are caused to be fully opened so that a scanning object (not shown) can be illuminated by the colored lights 602. In one embodiment, the colored lights 602 are in four colored groups (red, green, blue and special) that are sequentially turned on. For each illumination by one of the colored lights 602, the photosensors 624 are operated to take an image of the scanning object, resulting in three colored images under red (R), green (G) and blue (B) lights and a special-feature image under the special (S) light.

For illustration purpose, the photosensors 624 are shown shifted from the display pixel array 626. In one embodiment, one is on top of the other. FIG. 6C shows a simplified cross-section view of an LCD. An scanning object (e.g., a currency bill) 621 is placed against the LCD. The underlying display pixel array 626, each including one or more liquid crystals to control how much the backlighting goes through. During a scanning operation, the light sources 622 are turned on consecutively, resulting in corresponding reflected lights from the scanning object 621. The corresponding reflected lights are respectively passed through the opened liquid crystals and captured by the sensor array 624. As a result, there are four corresponding images, each from one illumination.

As shown in FIG. 6D, three of the four colored images R, G, and B are sufficient to reproduce the colors in the scanning object 612 shown as a currency bill. To detect electronically if a received dollar bill is counterfeit, a user may use a portable device to scan the bill. In operation, the bill is placed onto a display screen of the portable device. An application or program is activated to scan or take a snapshot of the bill. The application turns on the special light (S) which is in general not needed for simply reproducing color images. Under the special illumination, hidden marks (e.g., security threads) will be shown. Thus the fourth image S under the illumination of the special (S) light will capture the hidden marks. For example, plastic strips in high-denomination US dollar bills should glow a specific color under ultraviolet. A $5 dollar bill should glow blue, $10 bill should glow orange, a $20 bill should glow green, a $50 bill should glow yellow and a $100 bill should glow pink. When the four images R, G, B and S are combined, the combined image gives the application a good foundation (clue) to determine whether the bill being inspected is genuine or counterfeit.

FIG. 6E shows how one embodiment of the present invention is used to scan more than one fingerprint. iPhone 5 is equipped with the capability to capture a fingerprint of a user for authentication, where a touch ID is built into the home button of an iPhone. In other words, there is no way for such a device to authenticate a user based on more than one fingerprint simultaneously. In reality, verifying five fingerprints is more secure or desirable than verifying only one fingerprint.

FIG. 6E shows that a hand 630 of a user is placed on a display screen 632. This action may be required upon a transaction being initiated. For example, when the user uses a device including the display screen 632 to pay for an item in a store or place an order online, the retailer or seller requires that the user is authenticated to proceed with the transaction. Once the hand 630 is placed upon the display 632, an embedded program in the device is configured to proceed to scan the entire hand 630 or to detect where the five tips of the hand are located in the screen 632. According to one embodiment, five scanning windows 634 are automatically located per the locations of the tips detected. According to another embodiment, the five scanning windows 634 are pre-located on the display so that the user matches his hand/fingers to the scanning windows 634. According to still another embodiment, a part of the palm is also required to be scanned, in which case a separate window may be allocated to scan that portion of the palm. In any case, those skilled in the art can appreciate that there are ways to scan one or more of the fingerprints, or a portion or all of the palm with the embodiment of the present invention.

It is now assumed that only five fingerprints are scanned. Once the fingers are placed against the display 632, the fingers are illuminated by the underlying lights and the reflections thereof are captured by the underlying photosensors, resulting in five respective fingerprints 636. These fingerprints 636 may be analyzed locally in an application to verify if the user is authenticated or even transported to a server remotely located with respect to the device. In one embodiment, the special light used is an infrared source. Various biometric characteristics of the hand or palm is captured by the photosensors under the illumination of the infrared light, resulting in a special-effect color image together. It should be noted that it is not required to turn on each of the light sources in the display 632. According to one embodiment, a display device may be equipped with one or more light sources, one or all of the light sources may be turned on depending on a specific application.

Figure 7:
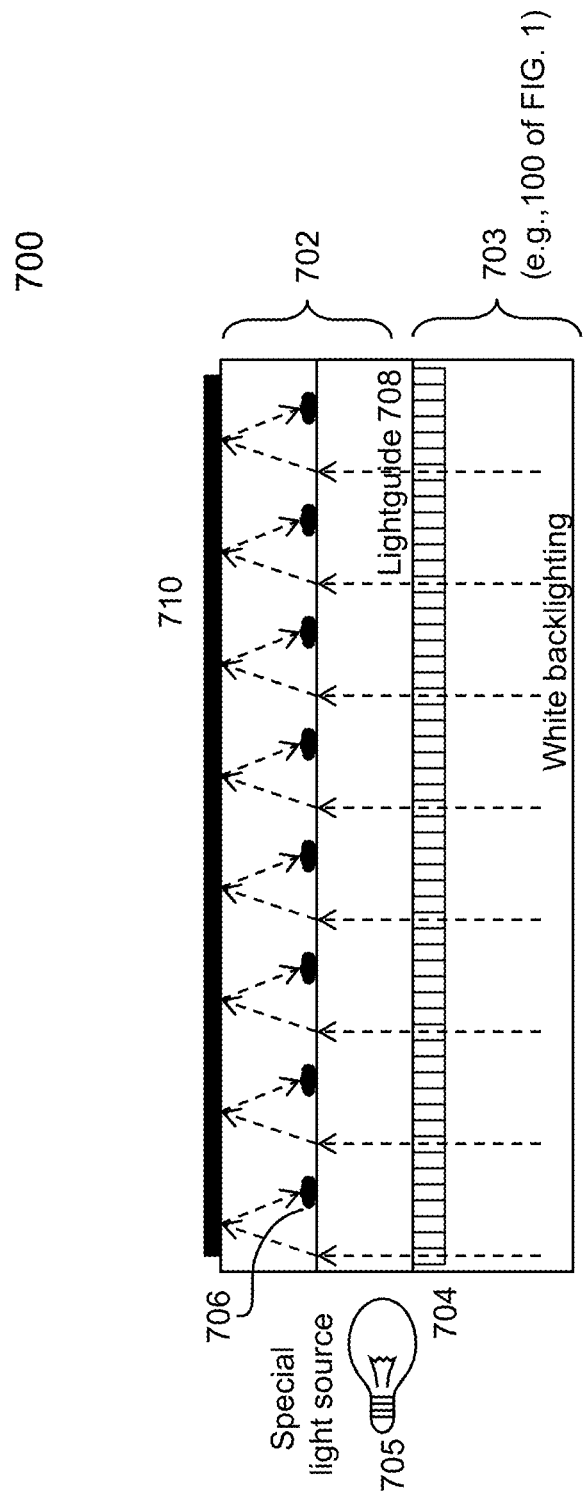
FIG. 7 shows another configuration of overlaying a layer 702 on top of a display device.

Referring now to FIG. 7, there shows another configuration 700 of overlaying a layer 702 on top of a display device. An example of the display device may correspond to the display device 100 of FIG. 1. The display device 100 uses white backlighting that may be made from an array of white LEDs or three different colored LEDs (e.g., red, green and blue). Using an array of colored filters 704, the colors of an image are reproduced on the display.

The layer 702 includes a special light source 705, an array of photodetectors 706 and a lightguide 708. The special light source 705 may include, but not be limited to, an infrared or a ultraviolet (UV) light. As shown in FIG. 7, the function of the lightguide 708 is to produce a planar light to evenly illuminate some or all of a scanning object 710. The detail of the lightguide 708 is not to be further described it is fairly well known to those skilled in the art. When not in operation, the layer 702 is almost invisible to human eyes, which means an image or video being displayed on the display device may be viewed through the layer 702. Likewise, a color image of the scanning object 710 can be generated via the photodetectors 706. The liquid crystals (not shown) in the display device 100 for each of colored filters 704 are all turned on, resulting in the white backlighting to go through the color filters 704. For example, there are three types of color filters, red, green and blue. When the liquid crystals for the red filters are all on, the white backlighting going through the red filters to shine the scanning object 710. The reflection of the red-filtered light from the scanning object 710 is captured by the photodetectors 706, resulting in a red colored image. The same applies to the green and blue filters, resulting in green and blue colored images.

When in operation (e.g., required to illuminate an ID card, a currency bill or a palm), the special light source 705 disposed on side is turned on. Through the lightguide 704, the light from the special light source 705 is guided and diffused to illuminate the scanning object 710, the reflection from the scanning object 710 is captured by the photosensors 706 to generate a special-effect image.

Figure 8A:
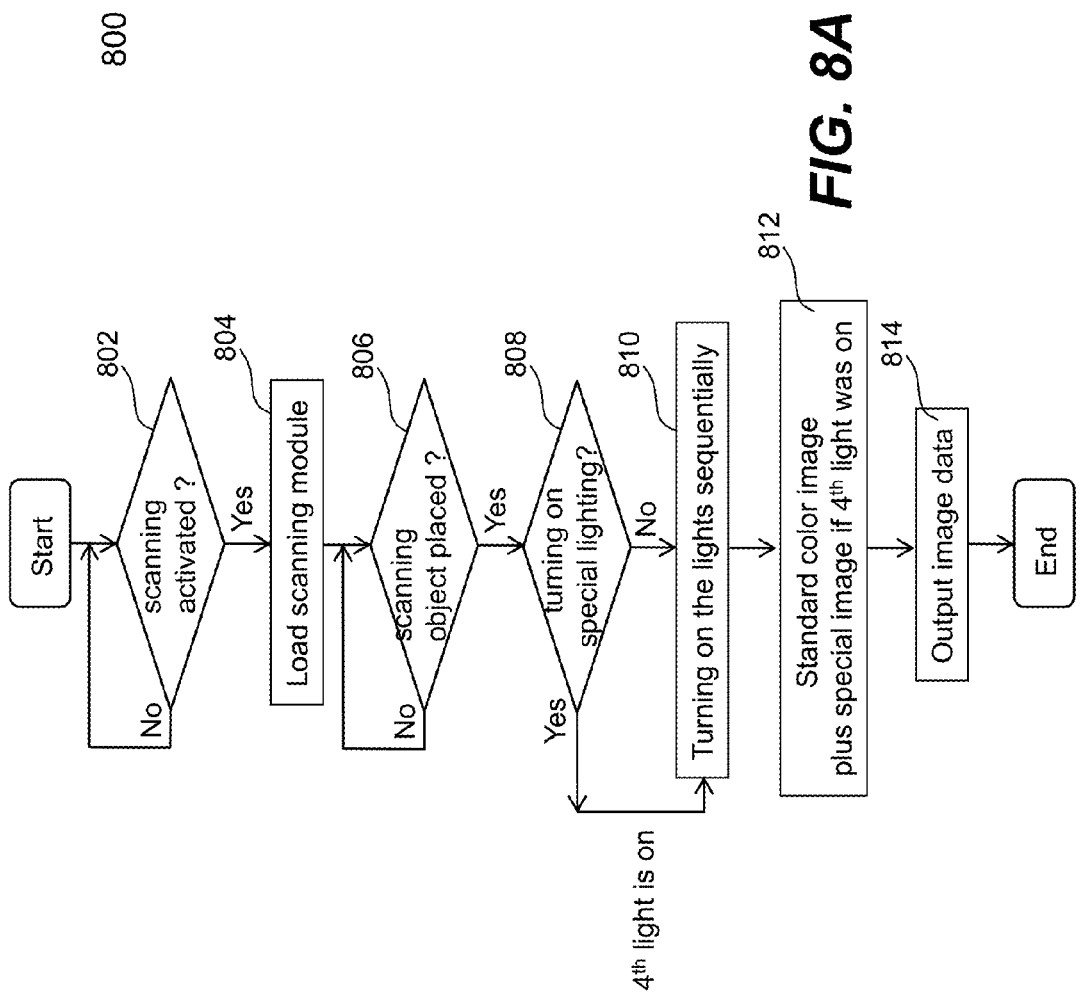
FIG. 8A shows a flowchart or process for a display device enabled for scanning an object (e.g., a document, a palm, an ID or a currency bill) according to one embodiment of the present invention.

FIG. 8A shows a flowchart or process 800 for a display device enabled for scanning an object (e.g., a document, a palm or a currency bill) according to one embodiment of the present invention. The process 800 may be implemented in a computing device with a display that can be driven to have a moment of see-through. An example of the computing device includes, but may not be limited to, a handheld computing device, a desktop computing device. According to one embodiment, the process 800 may be further understood in conjunction with the previous drawings.

At 802, the process 800 determines if the scanning function of the computing device is activated. Depending on implementation, the scanning function of the computing device is activated via a button accessible on the display of the computing device or via a program. For example, a user is requested to verify himself before a transaction is authorized or desires to scan a document or verify a currency bill. An application or a step in a program preinstalled in the computing device is activated to start the scanning process. At 804, a processor in the device is configured to instruct the user to place the scanning object onto or against the display.

Depending on implementation, there are different ways to require the user to place the scanning object. For example, at least a region of interest is defined and displayed on the display to require the user to place the scanning in the region. Alternatively, the location of the scanning object being placed against the display is detected to form the region of interest (i.e., scanning region). When the scanning operation starts, the region of the display is driven to have a moment of see-through so that the scanning object is illuminated by one or more different lights in the display, meanwhile the reflection from the scanning object is captured by the underlying photosensors. As shown in FIG. 6E, to define the region of interest is optional but preferable to avoid generating sensing data that has nothing to do with the scanning object.

It is assumed at 806 that the scanning object has been placed against the display. At 808, depending on what is being scanned or what the application requires, a module in the application or computing device is configured to successively turn on some or all of the different lights. In particular, the module is configured to turn on one or more special lights to capture hidden characters (e.g., marks or threads) that could only be shown when illuminated under a special lighting.

The process 800 goes directly to 810 when there is no need to turn on the special light(s). Thus at 810, only the normal lights are successively turned to reproduce the colors in the scanning object. In a separate operation, the process 800 still goes to 810 with one or more parameters to turn on one or more of the special lights when there is such a need. Using the LCD as an example, the liquid crystals in a liquid crystal layer in the LCD device are turned on to allow the scanning object to be illuminated by the lights successively and imaged at the same time by the photodetectors.

At 812, a color image is produced to reproduce the colors in the scanning object. The color image is created under respective illuminations by three colored lights (e.g., red, green and blue). When one or more special light is turned on, a special-effect color image is created. It is understood to those skilled in the art that the special-effect color image may be a single combined image or a normal color image attached with an auxiliary special-effect color image.

In any case, the image created at 812 is coupled to a memory space (e.g., RAM) at 814 for further processing by the application, or another application in the device or a remotely located server.

Figure 8B:
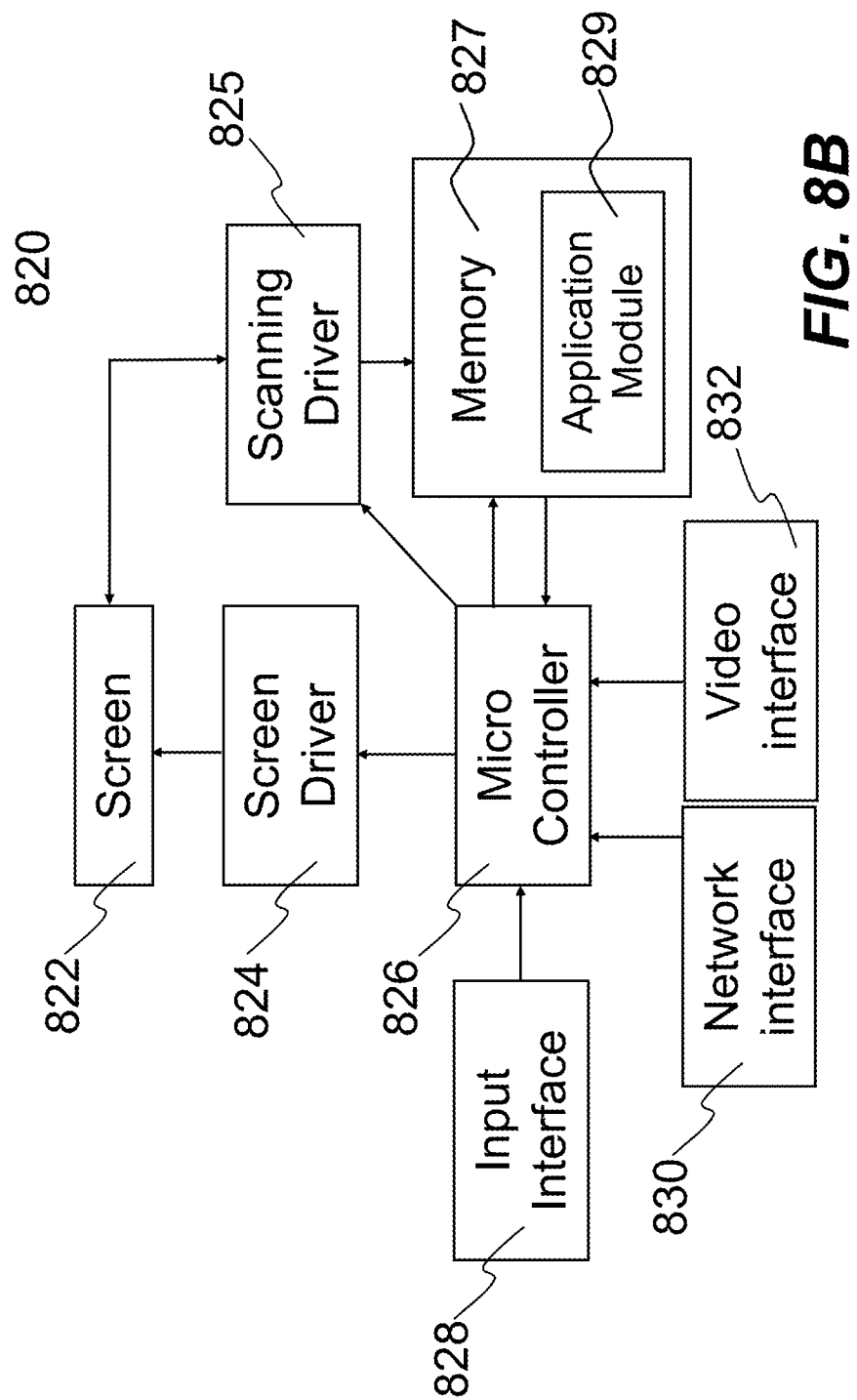
FIG. 8B illustrates an internal functional block diagram of a computing device that may be used in practicing one embodiment of the present invention.

FIG. 8B illustrates an internal functional block diagram 820 of a computing device that may be used in practicing one embodiment of the present invention. The screen 822 may be a display screen or display that can be driven to have a moment of see-through (e.g., LCD). The screen 822 communicates with and is commanded by a screen driver 824 that is controlled by a microcontroller (e.g., a processor) 826. The memory 827 may be loaded with one or more application modules 829 that can be executed by the microcontroller 826 with or without a user input via the user interface 828 to achieve desired tasks. The computing device 820 further includes a network interface 830 and a video interface 832. The network interface 830 is provided to enable the computing device 820 to communicate with other devices through a data network (e.g., the Internet or LAN). The video interface 832 is coupled to a video capturing device (e.g., a CMOS camera, not shown).

In one embodiment, an application module 829, referred to herein as an application or module, is designed to initiate a scanning-on-display (SOD) operation as described herein. The application module 829 implements one embodiment of the present invention and may be implemented in software or in combination of software and hardware, where the software portion is loaded in the memory 827 and executed by the processor 826. A general computer would not perform the functions or results desired in the present invention unless it is installed with the application module and execute it in a way specified herein. In other words, a new machine is created with scanning-on-display. As used herein, whenever such a module or an application is described, a phase such as the module is configured to, designed to, intended to, adapted to do a function means that the newly created machine has to perform the function unconditionally.

In particular, when the module 829 is executed, the computing device 820 instructs the screen driver 824 and scanning driver 825 to cause some or all of the screen 822 to have a predefined or controlled moment of see through in a defined region of the display 122. Thus images or video from a scanning object (not shown) can be seen by the photosensors (not shown) to generate a color image with or without an auxiliary special-effect color image.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

I claim:

1. A display device comprising;
   a display unit;
   an image sensing module behind the display unit, the image sensing module including an array of photosensors; and
   a set of different lighting sources to illuminate a scanning object being placed against the display unit through the display unit, wherein the display unit is driven to have a moment of see-through, and the different lighting sources are turned on successively for the photosensors to generate corresponding colored images for a color image to reproduce colors in the scanning object.

2. The display device as recited in claim 1, wherein the color image is an image of the scanning object.

3. The display device as recited in claim 1, wherein the different lighting sources includes at least a special light to reveal certain marks in the scanning object when the special light is turned on, these marks are not meant visible under a normal lighting.

4. The display device as recited in claim 3, wherein the color image includes a special-effect of these marks.

5. The display device as recited in claim 4, wherein the special light is related to infrared or ultraviolet.

6. The display device as recited in claim 1, further comprising a control module to define a scanning region smaller than a display area of the display unit, wherein only a portion of the scanning object falling into the scanning region is imaged.

7. The display device as recited in claim 6, wherein the scanning region is displayed on the display unit, and the scanning object has to be placed onto the display unit according to the scanning region.

8. The display device as recited in claim 1, wherein a scanning region smaller than a display area of the display unit is automatically determined based on detection of certain parts of the scanning object.

9. The display device as recited in claim 8, wherein only a portion of the scanning object falling into the scanning region is imaged by the photosensors.

10. The display device as recited in claim 1, wherein the scanning object is one of a group consisting of a palm, a finger, a currency bill and an ID card.

11. A display device comprising;
a display unit including a white backlight and an array of three different colored filters;
an image sensing module formed as a sheet disposed on top of the display unit, the image sensing module including a special light, a light waveguide and an array of photosensors, wherein the special light is caused to turn on to illuminate a scanning object being placed onto the display unit and in contact with the image sensing module and imaged by some or all of the photosensors in the image sensing module to produce a special-effect image.

12. The display device as recited in claim 11, wherein the special light is disposed on one side of the light waveguide and impinged into the light waveguide that produces even lighting to illuminate some or all of the scanning object photosensors.

13. The display device as recited in claim 12, wherein the special light is only turned on when the scanning object includes certain marks that are not visible under a normal lighting condition.

14. The display device as recited in claim 13, wherein the display device is part of a computing device configured to execute an application, the application is configured to turn on the special light to produce the special-effect image.

15. The display device as recited in claim 14, wherein the scanning object is from a group consisting of a palm, a finger, a currency bill and an ID card.

16. The display device as recited in claim 11, wherein the scanning object being placed onto the display unit is respectively illuminated by three colored lights transmitted through the three different colored filters, and the array of photosensors generates three colored images, the three colored images are readout to produce a color image of the scanning object.

17. The display device as recited in claim 16, wherein the display unit is driven to have a moment of see-through to allow respectively the three colored lights to transmit through the three different colored filters.

18. The display device as recited in claim 11, wherein the display unit displays at least a scanning region to instruct a user to place a portion or all of the scanning object thereon to be scanned according to the displayed scanning region.

19. The display device as recited in claim 18, wherein the scanning region is smaller than a display area of the display unit, only a portion of the scanning object falling into the scanning region is illuminated and imaged.

20. A display device comprising;
a display unit driven to display thereon at least a scanning region;
a sensing module integrated with the display unit; and
at least a light source to illuminate a portion of an object being placed in the scanning region and against the display unit, wherein the display unit is driven to have a moment of see-through, and at least a source is turned on to cause the sensing module to generate an image of the portion of the object.

* * * * *